United States Patent Office 3,028,408
Patented Apr. 3, 1962

3,028,408
PREPARATION OF ALKYL ALUMINUM
HALIDE PRODUCTS
Horace E. Redman and Thomas O. Sistrunk, Baton
Rouge, La., assignors to Ethyl Corporation, New York,
N.Y., a corporation of Delaware
No Drawing. Filed May 18, 1959, Ser. No. 813,679
1 Claim. (Cl. 260—448)

This invention relates to the manufacture of organoaluminum halide products. More particularly, the invention relates to the rapid production of alkyl aluminum halides, such as methyl aluminum sesquichloride, ethyl aluminum sesquichloride, ethyl aluminum sesquibromide, and similar organometallic halogen products.

It has long been known that aluminum metal will react with certain organo halide materials to produce alkyl aluminum halide products. The alkyl aluminum halide products are valuable chemicals for components of catalysts for olefin polymerization processes, or as source materials for producing trialkyl compounds. Illustrative of these reactions is the generation of methyl aluminum sesquibromide. This material, which is essentially a mixture of dimethyl aluminum bromide and methyl aluminum dibromide, can be produced by the following reaction:

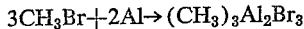

An analogous reaction is the generation of ethyl aluminum sesquichloride, by the following type of reaction:

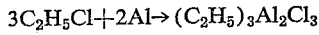

While the foregoing reactions are perfectly operable, somewhat drastic conditions are occasionally required to achieve reasonable rates of reaction, and in addition, it is frequently difficult to initiate reaction of fresh aluminum feed. Accordingly, it is found necessary in prior practice to employ more drastic temperature and pressure conditions than are desirable, and to provide longer residence times to effect a good conversion as a result of which production has frequently been uneconomical. Frequently, the relatively drastic conditions required have resulted in formation of substantial quantities of undesirable by-products, including, for example, alkane or alkene by-products or hydrogen halide. A significant need thus exists for an improved mode of carrying out the reaction of the lower alkyl halides with aluminum metal to achieve a good rate of reaction in producing the sesquihalide aluminum products or similar components thereof.

A general object of the present invention is therefore to provide a rapid and smoothly reacting process for the production of the desired alkyl aluminum halide product. More particularly, the present invention is directed to providing a new and improved process for the generation of the lower alkyl aluminum chlorides or lower alkyl aluminum bromides. By lower alkyl compounds is meant the compounds wherein the alkyl groups have from one to two carbon atoms, e.g. methyl or ethyl radicals. A more particular object is to provide an especially initiated or catalyzed process for carrying out the reaction of aluminum metal with an alkyl halide to achieve a rapidly initiated and catalyzed reaction. Other objects will appear hereinafter.

The present invention comprises, in its most general form, in the manufacture of an alkyl aluminum sesquichloride or an alkyl aluminum sesquibromide by direct reaction of aluminum metal with the corresponding lower alkyl halide of the types cited, the catalysis of the desired reaction by the presence of minor quantities of an alkyl halide, the halogen thereof being of higher atomic number than the halogen of the alkyl halide reactant. Thus, in the synthesis of, for example, ethyl aluminum sesquichloride, $(C_2H_5)_3Al_2Cl_3$, employing a reaction of ethyl chloride and subdivided aluminum metal, the desired reaction can be promoted or initiated by the presence of minor quantities of either an alkyl bromide or an alkyl iodide. In the comparable reaction of an alkyl bromide with aluminum, according to the present invention, catalysis is effected by the presence of minor quantities of an alkyl iodide compound.

In the most effective and feasible embodiments of the process, the reaction is initiated and carried out with a substantial quantity of the desired alkyl aluminum halide present as a liquid reaction medium, and the alkyl halide employed as a reactant is fed in over a finite period. Thus, in preparing, for example, ethyl aluminum sesquichloride from aluminum and ethyl chloride, a supply of ethyl aluminum sesquichloride is initially charged along with the aluminum to be converted. Similarly when making methyl aluminum sesquibromide, ethyl aluminum sesquibromide, or methyl aluminum sesquichloride, appreciable quantities of these liquid products are initially provided and maintained in the reaction zone to wet the aluminum being reacted and assist in the initiation of the reaction.

The invention is capable of great flexibility in its actual implementation. Thus, the higher alkyl halide can be fed as a minor component at the start of a reaction. Alternatively, if desired, minor concentrations of the higher organohalide can be provided intermittently or continuously during the course of the reaction, or at a late portion in, for example, a batch reaction when the rate of reaction has materially decreased and increased rapidity and catalysis is more necessary. The alkyl halides employed as catalysts herein are generally liquid compounds at ambient conditions and at the conditions of operation and can be admixed with the primary alkyl halide reactant or added separately. The particular concentration will vary greatly with circumstances and the degree of catalysis essential, but in typical operations, the alkyl halide employed as a catalyst is provided in proportions of, for example, up to as much as 30 mole percent, based upon the total halogen compound present. In most cases, however, only minor concentrations, of the order of 1-6 or up to about 12 mole percent are provided. Expressing the proportions of catalyst employed on a different basis, the preferred concentration range is from about 1 to about 5 weight percent, based upon the amount of aluminum metal charged. In those embodiments of the process wherein the higher alkyl halide is employed solely in an initiator fashion, that is, by causing initial reactive contact with the aluminum prior to the addition of a lower alkyl primary halide reactant, it is frequently felt desirable to provide the higher alkyl halide in solution in an inert solvent in order to provide the desired contact with the aluminum material present. In the preferred embodiments of the process, wherein a further benefit is achieved by providing an excess of the desired alkyl aluminum sesquichloride present at all times, the need for an inert solvent disappears.

The conditions of operation will depend to some extent upon the physical properties of the product and of the alkyl halide employed, and temperatures and pressures are not extremely critical. Due to the employment of the catalyst or initiators of the present invention, however, it is found that a much more rapid and smoother reaction can be provided at moderate conditions.

The details of the invention and manner of carrying out several embodiments thereof will be clear from the detailed description and examples given below.

Example I

In this operation, a reactor was charged with 1,340 parts by weight of comminuted aluminum in the form of finely divided chips which had been stored under an inert gaseous atmosphere. In addition, 2,024 parts of ethyl aluminum sesquichloride liquid, $(C_2H_5)_3Al_2Cl_3$ was charged as a reaction medium. The reactor was closed and agitation was started, and ethyl chloride was fed to the reaction zone, after heating to a temperature of about 60–70° C. The ethyl chloride was fed at a rate sufficient to maintain the temperature at this level. An appreciable induction period was required before a substantial rate of take-up was achieved, and after feeding for approximately 4 hours at the rate of about 3.4 parts of ethyl chloride per minute, average, the feed was discontinued because of the slow rate of take-up. Then approximately 79 parts of ethyl bromide were introduced, and then the feed of ethyl chloride was re-introduced. For a period of only about 0.3 hour, ethyl chloride was introduced at a greatly accelerated rate, which averaged 11.5 parts per minute or at an increase of 240 percent over the rate of reaction encountered in the initial operation. At the termination of this period, the rate of take-up had decreased, and an additional small amount of ethyl bromide was added, and a comparable rejuvenation or increase in ethyl chloride take-up rate was experienced upon again feeding ethyl chloride thereto. By this technique, an overall satisfactory rate of reaction to produce ethyl aluminum sesquichloride in high yield was achieved.

Upon completion of the reaction, the excess of unreacted ethyl chloride was vaporized, and then the ethyl aluminum sesquichloride, was distilled from the reaction vessel at a vacuum of below about ten millimeter mercury pressure.

*Example II*

When the procedure of the foregoing example is repeated, except that, instead of using ethyl bromide as the catalyst, a corresponding and equivalent amount of ethyl iodide is introduced, comparable results are achieved in increasing the reaction rate.

Instead of intermittently catalyzing the process by applications of discrete amounts of the higher halide compound, as in the preceding two examples, the process can be carried out with a constant proportion of the higher halide component added along with the primary halide reacted. This is illustrated by the following example.

*Example III*

In this operation, a charge of aluminum and ethyl aluminum sesquichloride is initially provided to the reactor. In carrying out the reaction, however, a feed of ethyl chloride accompanied by approximately 10 weight percent dissolved ethyl bromide is provided. A high and continuous rate of reaction was provided to give a high yield of ethyl aluminum chlorides.

If desired, the proportion of ethyl bromide in this operation can be increased to as much as 30 mole percent. However, in such an instance, a careful separation of the ethyl aluminum sesquichloride from bromine containing compounds is necessary, if a chloride compound alone is desired as a product.

*Example IV*

Instead of providing ethyl aluminum sesquichloride as a liquid reaction medium upon the start of a cyclic type of operation, an aluminum charge can be initially treated with the catalyzing alkyl halide, prior to reacting with the primary alkyl halide, and employing an inert solvent, as in this example.

In this case a charge of aluminum wire, subdivided into very small lengths, is charged to a reaction zone along with approximately two times its weight in a solvent comprising principally N-heptane. In addition, ethyl bromide or ethyl iodide, in the proportions of from one to 10 percent of the weight of aluminum, is charged to the reaction zone, and the contents heated to 40 to 70° C. for a period of at least about 15 minutes. The ethyl chloride reactant flow is then started, and a high rate of reaction is experienced. As the amount of the available aluminum for reaction becomes depleted, in a cyclic operation as in this instance, the effective rate of further ethyl chloride addition can be increased by additional addition of ethyl bromide, or ethyl iodide if desired, as in Examples I and II preceding.

As previously described, the principle of the present invention is applicable to the manufacture of the other alkyl aluminum halides, of which methyl aluminum sesquichloride is a particularly significant example, as illustrated by the following example.

*Example V*

In this operation, generally, the same procedures are applied, except that comparable quantities of methyl chloride are used as the primary reactant and the catalyst is methyl bromide. Similar improvements in, or high reaction rates, are experienced.

If desired, instead of methyl bromide, ethyl bromide can be utilized, although in such instances, when copious quantities of the catalyst or initiator are employed, the product will contain some minor proportions of ethyl radicals therein.

*Example VI*

The procedure of Example V above is repeated except that methyl iodide is employed as the initiator. Similar results are achieved.

*Example VII*

In this operation a reaction vessel was charged with 32 parts of sub-divided, clean aluminum metal, and this charge was heated to 85° C. by circulating hot oil through a jacket for the reactor. Liquid ethyl bromide was then added in small proportions, initially a small portion of about 15 parts of liquid ethyl bromide. In addition, 2 parts of ethyl iodide was added, and the reaction started shortly thereafter, with an increase in temperature to 85 to 110° C. A cooling medium was then circulated through the reaction vessel, to maintain the temperature of the reacting mixture in the neighborhood of about 75° C., and further additions of ethyl bromide were continued, until a total of about 164 parts had been fed. A rapid, easily controlled reaction was encountered and a high yield of ethyl sesquibromide $(C_2H_5)_3Al_2Br_3$ was produced.

The foregoing operation shows that it is not absolutely essential that the process always involve the presence of appreciable quantities of the desired alkyl aluminum halide as an initiating reaction medium. However, as shown by Examples I–III, the initial presence of a significant quantity of the desired liquid product is highly effective in providing efficient contact between the solid and liquid reactants.

To further illustrate a commercial mode of operation, the following example describes additional production of ethyl aluminum sesquichloride.

*Example VIII*

In this operation a repetitive cyclic technique is employed as follows:

The original charge to a reactor comprises 200 parts of aluminum, which is an excess from a preceding cycle. In addition, 600 parts of ethyl aluminum sesquichloride, $(C_2H_5)_3Al_2Cl_3$ is provided. Fresh aluminum, sub-divided to pass through a 40 mesh screen and be retained on an 80 mesh screen, is charged in the proportions of 500 additional parts. Ten parts of ethyl bromide are fed, this corresponding to about 1.4 percent by weight of the aluminum originally present. The reactor is maintained at a temperature of about 65° C. and autogenous pressure of about 50 pounds per square inch gauge. The reaction is conducted by feeding in a total of approximately 1,700 parts of ethyl chloride over a several hour period. Heat of reaction corresponding to over 1,000 B.t.u.'s per pound is removed by vaporization and refluxing of condensate. Feed is continued until the pressure drops to a steady level.

During the reaction, vigorous agitation is applied to the liquid solid system, but upon discontinuation of the reaction, agitation is terminated. The solids are allowed to settle, and a supernatant liquid phase, substantially free of aluminum metal solids, is withdrawn for purification and work up. In addition to facilitating a rapid and easy controllable reaction, the ethyl bromide catalyst minimizes formation of undesirable by-products such as ethylene, ethane and hydrogen chloride.

The aluminum employed in the process may be provided in a variety of forms. Thus, milled aluminum, or aluminum chips are a quite satisfactory source. Aluminum powder or flakes produced by stamping operations, or short lengths of fine aluminum wire, are frequently employed. Generally, it is found that the ease of reaction improves with the degree of subdivision, but, on the other hand, the more finely divided the aluminum source, the more sensitive it becomes to degradation through handling or exposure.

From the foregoing description it will be clear that the process of the invention can be appreciably altered without departing from the scope thereof. Thus, instead of employing cyclic operations, which are usually the most convenient for small to moderate scale operations, continuous techniques can be provided, wherein an aluminum feed is intermittently or continuously fed to a reaction zone, and a mixture of the reaction materials can be continuously withdrawn for segregation of the desired alkyl aluminum halide product, and recycle of the excess primary halide and unreacted aluminum.

The temperatures and pressure of operation are not highly critical. Ordinarily, it is preferred to operate in substantially all instances, at elevated temperatures of from 50 to about 100 to 125° C., and under the autogenous pressure of the system. In the case of the reaction of ethyl chloride as a primary halide with aluminum, and at temperatures of 60–70° C., the usual operating pressures are in the neighborhood of 40 to 60 pounds per square inch, gauge.

Having fully described the operation of the invention in the preferred modes of carrying forth the method, what is claimed is:

In a process of manufacture of ethyl aluminum sesquichloride comprising the reaction of ethyl chloride with subdivided aluminum metal in a reaction medium consisting essentially of ethyl aluminum sesquichloride, the improvement comprising carrying out the reaction in part until the rate of reaction decreases, and then adding ethyl bromide in proportions of from about 1 to 5 percent of the total aluminum originally present, and increasing the rate of reaction thereby.

References Cited in the file of this patent

UNITED STATES PATENTS

| | | |
|---|---|---|
| 2,712,546 | Coates | July 5, 1955 |
| 2,848,472 | Cottle | Aug. 19, 1958 |
| 2,852,544 | Nowlin | Sept. 16, 1958 |
| 2,863,894 | Smith | Dec. 9, 1958 |
| 2,958,703 | Nowlin et al. | Nov. 1, 1960 |

FOREIGN PATENTS

| | | |
|---|---|---|
| 196,416 | Austria | Mar. 25, 1958 |